(12) United States Patent
Hamahata et al.

(10) Patent No.: US 10,038,980 B2
(45) Date of Patent: Jul. 31, 2018

(54) SUPPORTING MANAGEMENT OF GROUPS OF MOBILE DEVICES

(71) Applicant: INTERNATIONAL BUSINESS MACHINES CORPORATION, Armonk, NY (US)

(72) Inventors: Kenji Hamahata, Chagasaki (JP); Koichi Nishitani, Hodogaya-ku (JP); Tadayuki Yoshida, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/156,428

(22) Filed: May 17, 2016

(65) Prior Publication Data

US 2017/0339523 A1 Nov. 23, 2017

(51) Int. Cl.
*H04W 64/00* (2009.01)
*H04W 4/02* (2018.01)
*H04W 4/08* (2009.01)

(52) U.S. Cl.
CPC ............ *H04W 4/027* (2013.01); *H04W 4/023* (2013.01); *H04W 4/08* (2013.01)

(58) Field of Classification Search
CPC ......... H04L 67/10; H04L 51/32; H04L 67/02; H04L 51/24; H04L 65/4076; H04L 61/2553; H04W 4/206; H04W 88/02; H04W 76/045; H04M 1/274516

USPC .............. 455/456.3; 370/252; 707/722, 739; 726/1

See application file for complete search history.

(56) References Cited

U.S. PATENT DOCUMENTS

| 9,055,390 | B2 | 6/2015 | Lor et al. | |
| 2006/0256008 | A1* | 11/2006 | Rosenberg | G01C 21/20 342/367 |
| 2008/0145045 | A1 | 6/2008 | Chen et al. | |
| 2013/0185285 | A1* | 7/2013 | Shuman | H04W 76/002 707/722 |
| 2015/0058324 | A1* | 2/2015 | Kauwe | G06Q 50/01 707/722 |
| 2015/0237477 | A1 | 8/2015 | Yu et al. | |
| 2017/0257839 | A1* | 9/2017 | Alles | G01S 5/0036 |

FOREIGN PATENT DOCUMENTS

JP 2013224837 A 10/2013

* cited by examiner

*Primary Examiner* — Phuoc H Doan
(74) *Attorney, Agent, or Firm* — Samuel A. Waldbaum

(57) ABSTRACT

A method comprising: storing, by a computer, a list of mobile devices; creating, by the computer, a plurality of groups of the mobile devices, each group including at least one mobile device, based on locations of the mobile devices; providing, by the computer, at least one mobile device of the plurality of groups with information of a target location; and handling, by the computer, information for a mutual interaction between at least two groups of the plurality of groups.

20 Claims, 12 Drawing Sheets

SUPPORTING MANAGEMENT OF GROUPS OF MOBILE DEVICES

BACKGROUND

The present disclosure relates to supporting management of groups of mobile devices.

It may be difficult to guide a number of mobile devices to a designated location. It can be especially difficult to guide a number of mobile devices to a designated location when the mobile devices move in groups.

SUMMARY

There is a need for a method of guiding mobile devices that move in groups. The present disclosure implements a system, a computer-implemented method, and computer program product. In an embodiment, the method includes storing a list of mobile devices. The method also includes creating a plurality of groups of the mobile devices, each group comprising at least one mobile device, based on locations of the mobile devices. The method also includes providing at least one mobile device of the plurality of groups with information of a target location and furthermore, handling information for a mutual interaction between at least two groups of the plurality of groups.

In another embodiment, the computer system includes storing, a list of mobile devices. The computer system also includes creating a plurality of groups of the mobile devices, each group comprising at least one mobile device, based on locations of the mobile devices. The computer system also includes providing at least one mobile device of the plurality of groups with information of a target location and furthermore, handling information for a mutual interaction between at least two groups of the plurality of groups.

In another embodiment, the computer system includes storing, a list of mobile devices. The computer program product also includes creating a plurality of groups of the mobile devices, each group comprising at least one mobile device, based on locations of the mobile devices. The computer program product also includes providing at least one mobile device of the plurality of groups with information of a target location and furthermore, handling information for a mutual interaction between at least two groups of the plurality of groups.

The summary clause does not necessarily describe all of the features of the embodiments of the present disclosure. The present disclosure may also be a combination or sub-combination of the features described above, including a combination of features from two or more of the aspects described above. The above and other features and advantages of the present disclosure will become more apparent from the following description of the embodiments, taken in conjunction with the accompanying drawings.

DETAILED DESCRIPTION

It must be appreciated that, example embodiments of the present disclosure will be described. The embodiments should not be construed as limiting the scope of the disclosure, which is defined by the claims. The combinations of features described in the embodiments are not necessarily essential to the disclosure.

Figure 1:
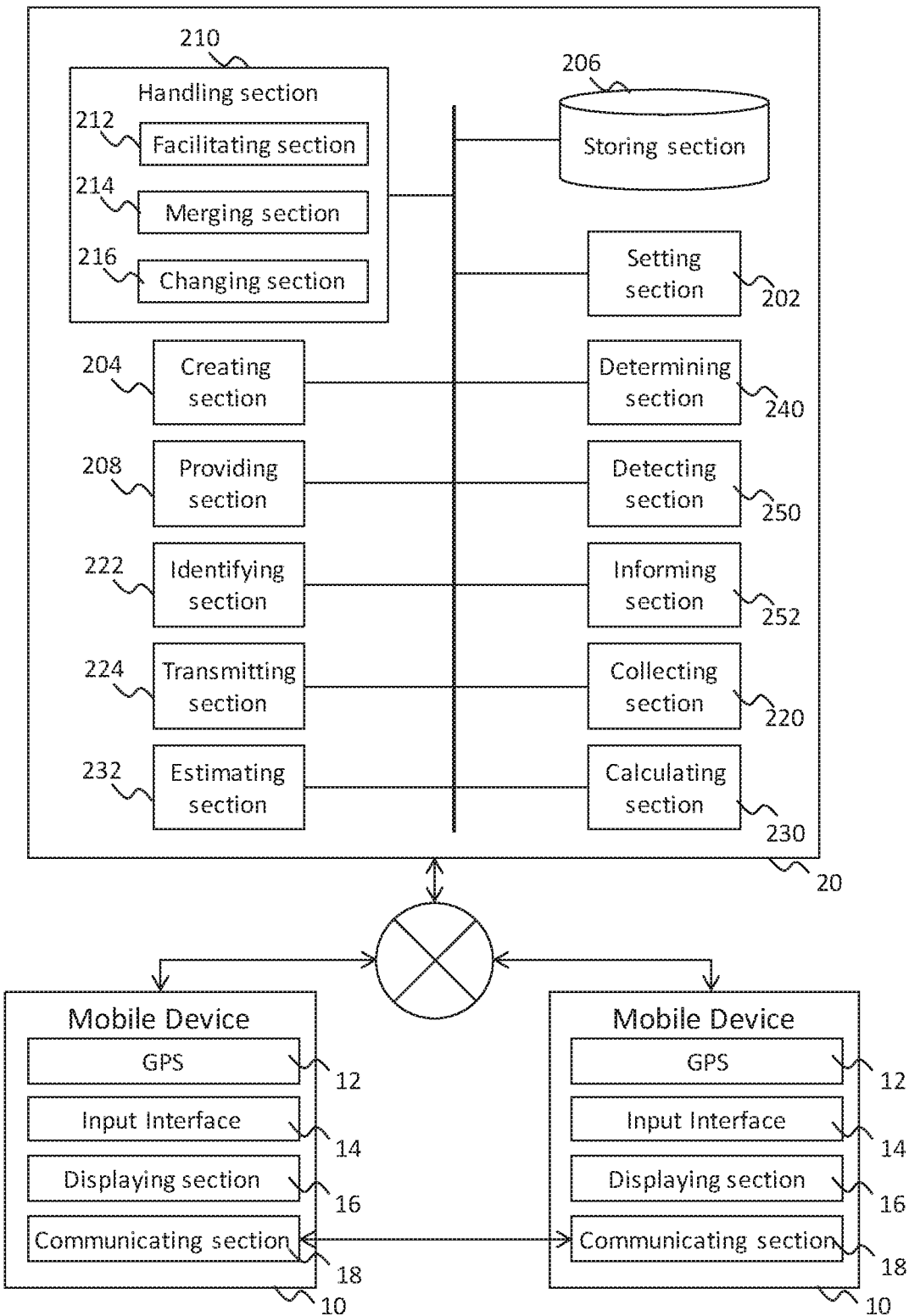
FIG. 1 shows an exemplary configuration of a system 1 according to an embodiment of the present disclosure.

FIG. 1 shows a system 1 according to an embodiment of the present disclosure. The system 1 may comprise a plurality of mobile devices 10 and a server 20. The mobile devices 10 may move towards a target location along with their users. For example, users of the mobile devices 10 may be a plurality of travelers who travel to a certain destination.

The mobile device 10 may be a device movable with a user, and may be one of a mobile phone, a smartphone, a laptop computer, a tablet computer, a personal digital assistant, etc. Although FIG. 1 describes only two mobile devices 10, the system 1 may include three or more mobile devices 10.

The server 20 may be a server computer that manages the plurality of groups of the mobile devices 10. The server 20 may provide a plurality of groups of mobile devices 10 moving in groups with guidance information. For example, the server 20 may provide the mobile devices 10 with guidance information during the travel to the target location. The server 20 may further handle a mutual interaction between the groups.

The mobile devices 10 may comprise a processor and one or more computer readable mediums collectively including instructions. The instructions, when executed by the processor, may cause the processor to operate as a plurality of operating sections. Thereby, the mobile devices 10 may be regarded as comprising a communicating section 18. The mobile devices 10 may be regarded as further comprising a GPS 12, an input interface 14, and a displaying section 16.

The GPS 12 may detect a current location of the mobile device 10. The input interface 14 may receive input to the mobile device 10 through a button, a touch panel, a keyboard, or the like from the user. The displaying section 16 may display images on a display screen of the mobile device 10. In one embodiment, the displaying section 16 may display an image of information received from the server 20.

The communicating section 18 may communicate with other mobile devices 10 and the server 20. The communicating section 18 of one mobile device 10 may communicate with the communicating section 18 of another mobile device 10 by short distance communication, or any other form of communication. The communicating section 18 may communicate with the server 20 by WLAN, telecommunication networks such as 3G networks or 4G networks, or any other form of communication.

The communicating section 18 may transmit information of the current location detected by the GPS 12 to the server 20. The communicating section 18 may receive messages from other mobile devices 10 and transmit messages to other mobile devices 10 directly or via server 20.

The server 20 may comprise a processor and one or more computer readable mediums collectively including instructions. The instructions, when executed by the processor, may cause the processor to operate as a plurality of operating sections. Thereby, the server 20 may be regarded as comprising a setting section 202, a creating section 204, a storing section 206, a providing section 208, a handling section 210, a collecting section 220, an identifying section 222, a transmitting section 224, a calculating section 230, an estimating section 232, a determining section 240, a detecting section 250, and an informing section 252.

The setting section 202 may set configuration of a session, during which the system 1 manages the groups of mobile devices moving towards the target location. For example, the setting section 202 may set a group policy and a registration method for the session. Further details of the operations of the setting section are explained below.

The creating section 204 may create a plurality of groups of the mobile devices 10 based on locations of the mobile devices. Each group of the plurality of groups may include at least one mobile device 10. In one embodiment, the users of the mobile devices 10 in a group may comprise a group of members who move together during the travel. The each group may include a representative mobile device 10, which may be used by a leader of the group of the members. Hereinafter, a user of the mobile devices in a group may be referred to as a "group member."

In one embodiment, the creating section 204 may receive information that certain mobile devices 10 are located within a certain distance from the representative mobile device 10. In such case, the creating section 204 may create a group including the representative mobile device 10 and certain other mobile devices 10.

The storing section 206 may store information of the mobile devices 10 and groups for managing the mobile devices 10 and the groups. In one embodiment, the storing section 206 may store a device ID list of the mobile devices 10.

In the embodiment, the device ID list may include a plurality of records, each of which corresponds to one mobile device 10. Each record may include information of the mobile device 10 (an ID of the mobile device 10, a user of the mobile device 10, a community of the user, etc.), information of a group to which the mobile device 10 belongs (e.g., an ID of the group, a name of the group, a relationship to the group, etc.), information of a team to which the mobile device 10 belongs (e.g., an ID of the team), information of whether the mobile device 10 is a representative mobile device or not, information of whether the mobile device 10 is a stray mobile device or not, etc. In one embodiment, phone numbers, email addresses, or other information (e.g., a user ID) may be used as the ID of the mobile device.

The storing section 206 may store the configuration set by the setting section 202, and other information needed for operations of the system 1. The storing section 206 may store other information used by the mobile devices 10 and the server 20.

The providing section 208 may provide at least one mobile device 10 of the plurality of groups with information of the target location. Thereby, the providing section 208 may guide the mobile devices 10 in each group to the target location.

The handling section 210 may handle information for a mutual interaction between at least two groups of the plurality of groups of the mobile devices 10. The mutual interaction may include an exchange of information between the at least two groups, a merger of the at least two groups, and a change of the mobile devices 10 between the at least two groups. The handling section 210 may comprise a facilitating section 212, a merging section 214, and a changing section 216.

The facilitating section 212 may facilitate an exchange of information of a meeting place between the at least two groups. In one embodiment, the group members in two groups may wish to meet and move together at some point during the travel to the target location. In such a case, the facilitating section 212 may facilitate the exchange of information of the meeting place such as suggestions of the meeting place.

The merging section 214 may merge the at least two groups of the plurality of groups into a new group. For example, the merging section 214 may merge the at least two groups after the two groups arrive at the target location, such as a meeting place.

The changing section 216 may change the mobile devices 10 of at least one group dynamically. For example, the changing section 216 may exchange the mobile devices 10 between two groups on the way to the target location. The changing section 216 may add the mobile device(s) 10 to the group or delete the mobile device(s) 10 from the group.

The collecting section 220 may collect locations of the mobile devices 10 of each group. For example, the collecting section 220 may receive information of a current location detected by GPS 12 from each of the mobile devices 10.

The identifying section 222 may identify a location of each group based on the locations of the mobile devices 10 of the each group. In one embodiment, the identifying section 222 may calculate a center of the locations of the mobile devices 10 belonging to a group collected by the collecting section 220, and identify the location of the group based on the center of the mobile devices 10 belonging to the group.

The transmitting section 224 may transmit the location of the plurality of groups to the mobile devices 10 of each group. In one embodiment, the transmitting section 224 may transmit the location of the groups identified by the identifying section 222 to the mobile devices 10 of each group.

The calculating section 230 may calculate moving speeds of the at least two groups. In one embodiment, the calculating section 230 may calculate moving speeds of a group based on information of the location of the mobile devices 10.

The estimating section 232 may estimate a time that the at least two groups will meet at the meeting place based on the locations of the at least two groups. For example, the estimating section 232 may estimate the time based on the locations of the at least two groups and the moving speeds of the at least two groups calculated by the calculating section 230.

The determining section 240 may determine a new representative mobile device among representative mobile devices of the at least two groups after the at least two groups are merged.

The detecting section 250 may detect a stray mobile device 10 apart from the group to which the stray mobile device 10 belongs.

The informing section 252 may receive information of the stray mobile device 10 from the detecting section 250 and inform a representative mobile device 10 of the group of a location of the stray mobile device 10.

As described above, the server 1 may collect information of the mobile devices 10, and manage the mobile devices 10 for the plurality of groups. The server 1 may also manage or handle a mutual interaction between the at least two groups of the plurality of groups.

Elements of the server 20 may provide information to each other as necessary. In one embodiment, the collecting section 220 may provide the information of the current locations of the mobile devices to the creating section 204, the providing section 208, the identifying section 222, the calculating section 230, the estimating section 232, the detecting section 250, etc.

Figure 2:
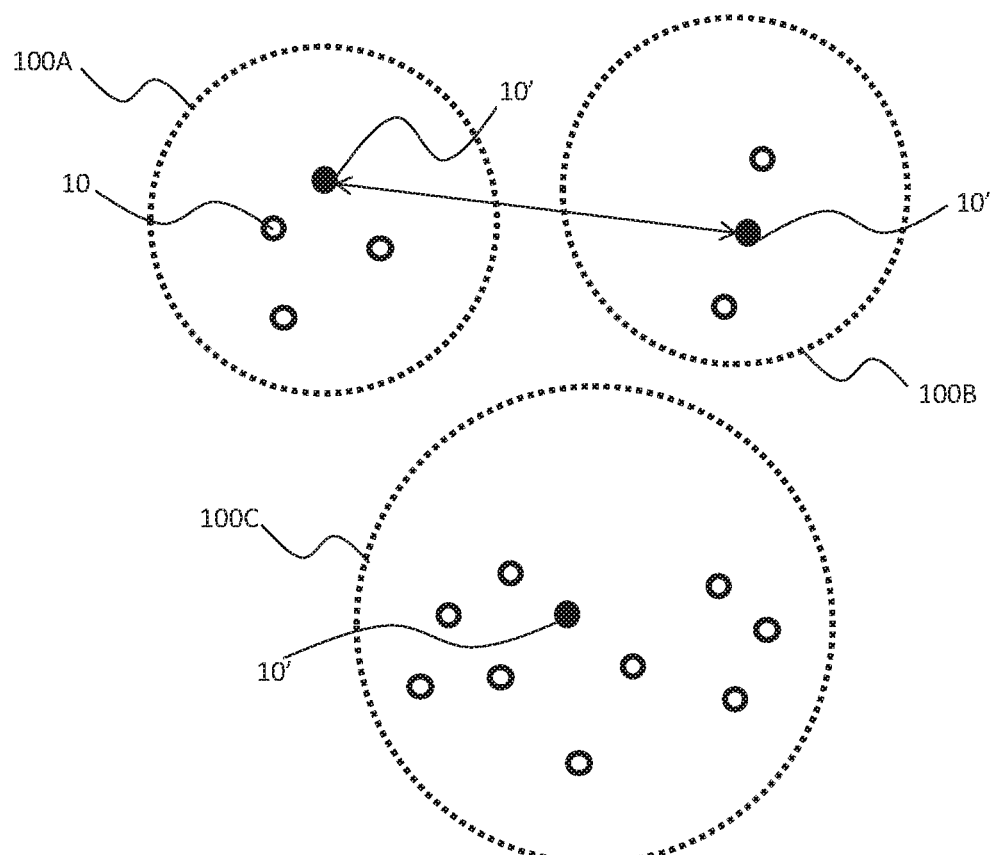
FIG. 2 shows an example of three groups of mobile devices according to an embodiment of the present disclosure.

FIG. 2 shows an example of three groups of the mobile devices 10. In the example, FIG. 2 shows a group A, a group B, and a group C. The group A includes a plurality of mobile devices 10 shown as white circles, and is shown as 100A. One of the mobile devices 10 in the Group A may be the representative mobile device 10' shown as a black circle. The group B (shown as 100B) and the group C (shown as 100C) may each include the representative mobile device 10'. When the groups communicate with each other, each representative mobile device 10' represents each group and the representative mobile devices 10' may transmit and receive messages among each other.

For example, the representative mobile device 10' in the group A may communicate with the representative mobile device 10' in the group B as shown in FIG. 2, but the representative mobile device 10' does not need to communicate with the other mobile devices 10 in the other groups.

The plurality of the groups may form a team. For example, a team may comprise the group A, the group B, and the group C. The system 1 may manage one or more teams, each comprising a plurality of groups of mobile devices 10.

Figure 3:
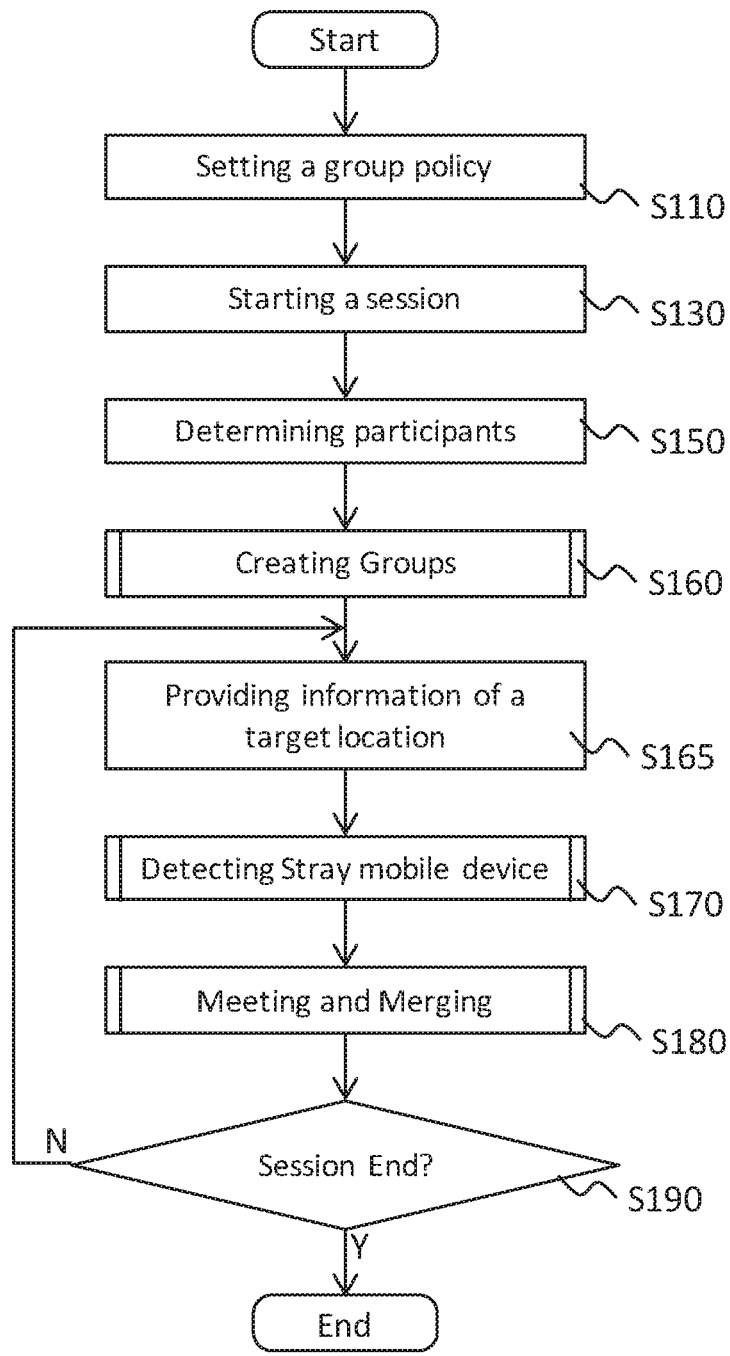
FIG. 3 shows an example operational flow of the system according to an embodiment of the present disclosure.

FIG. 3 shows an example operational flow of the system according to an embodiment of the present disclosure. The present embodiment describes an example in which a system, such as the system 1, performs the operations from S110 to S190, as shown in FIG. 3. The system may set the configuration of the session and manage groups of mobile devices during the session by performing the operations S110-S190.

First, at S110, a setting section such as the setting section 202 may set configuration of a session, such as a group policy and/or a registration method to groups.

In one embodiment, the setting section may receive a group policy from a computer of a session initiator. The computer of the session initiator may be one of the plurality of the mobile devices, the server itself, or other computers. In one embodiment, the session initiator may be a host of a trip to the target location.

The group policy may include a definition of a group, existence or non-existence of the representative mobile device, a definition of the representative mobile device, a workflow of transfer of the mobile device between groups (e.g., a definition of a stray mobile device), a workflow of determination of a new representative mobile device at a merger of groups, and a condition to start and/or end the session.

The definition of a group may include information of (a) group IDs, (b) team IDs, (c) representative mobile devices of each group (e.g., existence or non-existence of the representative mobile device, and/or, an authority of the representative mobile device), (d) qualification to join in a team or group (e.g., having a registered names, joining in a certain organization such as a certain company or social networking service (SNS), having a certain relationship such as family, friend, or alumnus with a user of the representative mobile device, located at a location so as to communicate by short distance communication, joining in the same trip, or sharing the same destination), and/or (e) a target/goal of each team/group (e.g., the destination, task, target, etc.).

In one embodiment, the setting section may receive the registration method for joining the session from the computer of the session initiator. In one embodiment, the mobile devices that have been registered in the system can join in a team and group. For example, the registration method may be starting a specific application, and sending the registration information via the application to the server. The setting section may register the mobile devices sending the registration information as participants to the session.

In other examples, the registration method may be registering information of the mobile devices such as phone numbers and/or email addresses. In the example, the setting section may receive information of the plurality of the mobile devices from the computer of the session initiator.

In other examples, the registration method may be collecting information of the mobile devices from a SNS service, a shared calendar service, or the like. In this example, the setting section may collect phone numbers and/or email addresses from a certain community (e.g., a community of participants to a travel) in SNS as participants to the session.

The setting section may store the group policy and/or the registration method to groups in the storage section.

Next, at S130, the system starts the session. For example, the setting section may disclose the registration method set at S110, and collect information of the mobile devices participating to the session.

Next, at S150, the server may determine the participants to the session according to the registration method. For example, the setting section may determine the mobile devices from which information is collected at S130, as the participants.

The server may determine the representative mobile devices for a plurality of groups among the plurality of mobile devices. In one embodiment, the setting section may randomly determine the representative mobile devices, or determine the representative mobile devices based on a nomination from the session initiator or self-nomination. The setting section may provide information of the mobile devices determined as participants, to the representative mobile devices of the plurality of groups.

Next, at S160, the system may create a plurality of groups of the mobile devices. Further details of S160 are explained below.

Next, at S165, a providing section such as the providing section 208 may provide the mobile devices in the group created at S160 with information of the target location. In one embodiment, the providing section may estimate the route from a location of the representative mobile device to the target location and may provide the mobile devices in the group with the route. In one embodiment, the providing section may retrieve information of tourist spots, shops, stores, restaurants, etc. on or near the estimated route, and provide the mobile devices in the group with the retrieved information.

Next, at S170, the system may detect a stray mobile device and may manage movement of the mobile device between the groups. Further details of S170 are explained below.

Next, at S180, the system may manage meeting and merging of at least two groups of mobile devices during the trip to the target location. The operation of S180 may be processed in parallel with the operation of S170. Further details of S180 are explained below.

Next, at S190, the server may determine whether to end the session. For example, a handling section, such as the handing section 210, may determine whether the condition to end the session stipulated in the group policy is met. The handling section may end the session if the decision is positive, and proceed with the operation of S170 if the decision is negative. In one embodiment, the condition to end the session may be that a closing time has arrived, that more than a certain number of mobile devices have arrived at a target location, or the like.

Figure 4:
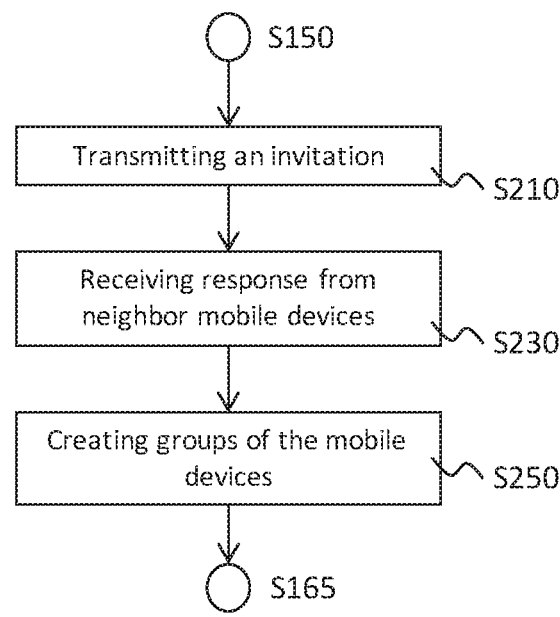
FIG. 4 shows an example operational flow of the system according to an embodiment of the present disclosure.

FIG. 4 shows an example operational flow of the system according to an embodiment of the present disclosure. The present embodiment describes an example in which a system, such as the system 1, performs the operations from S210 to S250, as shown in FIG. 4. The system may perform the operation of creating groups, such as S160 in FIG. 3, by performing the operations S210-S250.

At S210, the representative mobile device may transmit an invitation to other mobile devices by short distance communication such as Bluetooth®, infrared communication, etc. Therefore, the representative mobile device may transmit the invitation only to the mobile devices located near the representative mobile device.

Next, at S230, the representative mobile device may receive responses to the invitation from mobile devices via short distance communication or other network types. The representative mobile device may receive the responses including acceptance or rejection to the invitation and the identification information of the mobile devices (e.g., IDs, phone number, or, email address of the mobile devices), and transmit the identification information of the mobile devices to the server.

The representative mobile device may receive a response indicating that the mobile device receiving the invitation has accepted the offer or a response indicating that the mobile device receiving the invitation has rejected the offer.

The representative mobile device may transmit information of the received response from the mobile devices to the server. In one embodiment, the representative mobile device may transmit device IDs of the responding mobile devices to the server.

Next, at S250, a creating section, such as the creating section 204, may create a group of the mobile devices 10 based on the responses received at S230. In one embodiment, the creating section may create a group including the representative mobile device and the mobile devices that have accepted the invitation. In the embodiment, the creating section may update records of the mobile devices of the created group in the device ID list stored in the storing section.

The system may perform the operations of S210-250 for each of the representative mobile devices, and create one or more groups. In one embodiment, the creating section may create groups based on the locations of the mobile devices instead of the operations of S210-250.

In this embodiment, a collecting section, such as the collecting section 220, may collect locations of the mobile devices by receiving information of the current location of the mobile devices from GPS 12. The creating section may then divide the mobile devices into the plurality of groups based on the locations of the mobile devices. For example, the creating section may divide the mobile devices into a certain number of groups such that the total distance between the representative mobile device (or center) of the group and the mobile devices belonging to each group is minimized.

Figure 5:
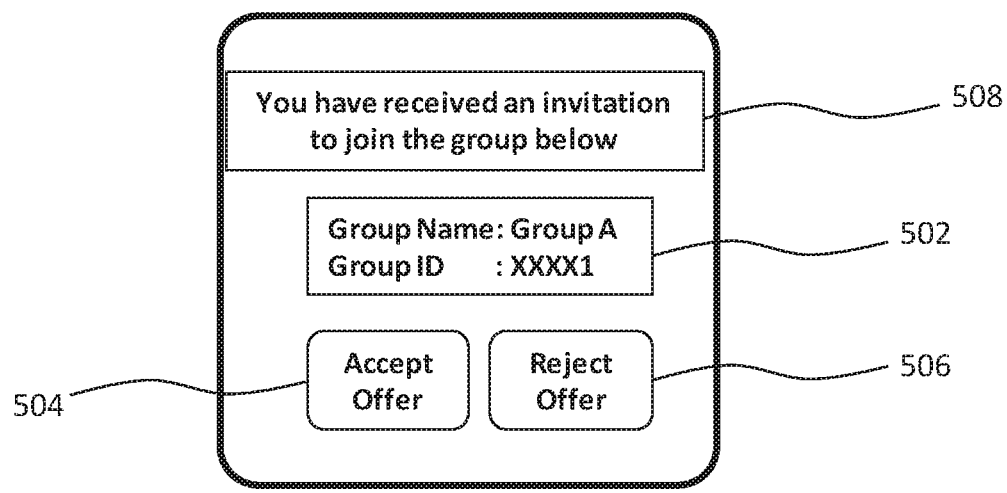
FIG. 5 shows an example of an invitation according to an embodiment of the present disclosure.

FIG. 5 shows an example of an invitation transmitted at S210. For example, mobile devices located near the representative mobile device and capable of communicating with the representative mobile device via short distance communication may receive an invitation, as shown in FIG. 5. The mobile device receiving the invitation may show a message "Receive an invitation to join the group below" (box 508) on the display screen, and receive a response of either "Accept Offer" or "Reject Offer" from the user. The user of the mobile device may input the response by tapping the "Accept Offer" icon 504 or "Reject Offer" icon 506.

The representative mobile device may transmit the invitation to a team instead of the invitation to a group. In such an embodiment, the representative mobile device may transmit information of the mobile devices accepting the invitation to the server, and the setting section may register such mobile devices as the participants.

Figure 6:
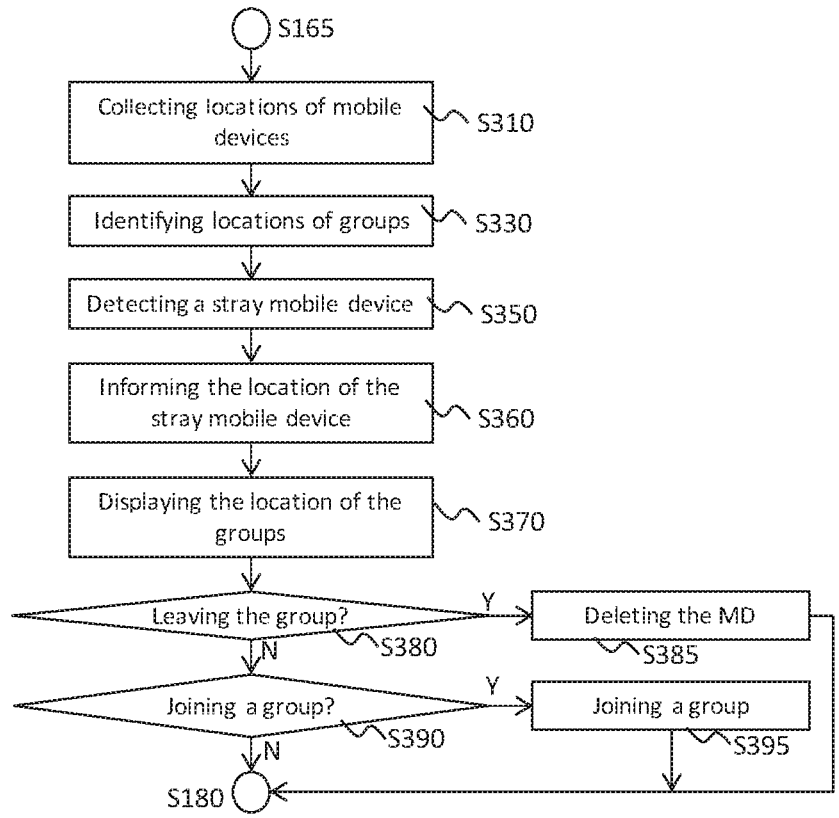
FIG. 6 shows an example operational flow of the system according to an embodiment of the present disclosure.

FIG. 6 shows an example operational flow of the system according to an embodiment of the present disclosure. The present embodiment describes an example in which a system, such as the system 1, performs the operations from S310 to S395, as shown in FIG. 6. The system may detect a stray mobile device, such as the operation of S170 in FIG. 3, by performing the operations S310-S395.

At S310, a collecting section, such as the collecting section 220, may collect locations of the mobile devices. In one embodiment, each of the plurality of the mobile devices may detect its current location by GPS, and transmit information of the current location to the server. The collecting section of the server may receive the information of the current locations from the plurality of the mobile devices.

Next, at S330, an identifying section such as the identifying section 222 may identify the locations of groups. In one embodiment, the identifying section may calculate a center location of a plurality of mobile devices in a group, and determine the center location as the location of this group. In other embodiment, the identifying section may determine the location of the representative mobile device of a group as the location of this group.

Next, at S350, a detecting section, such as the detecting section 250, may determine a stray mobile device, which strays from the group to which it belongs. In one embodiment, the detecting section may compare a location of each mobile device in a group and a location of the group, and may detect a mobile device that is distant from the location of the group to which it belongs by at least a threshold distance, as the stray mobile device.

In some embodiments, the detecting section may detect a mobile device that is distant from the location of the group for a time longer than a certain duration, as a stray mobile device. In some embodiments, the detecting section may not determine the mobile device(s) as a stray mobile device, if the detecting section finds the mobile device(s) located in a certain location such as a bathroom, a ticket office or the like.

Next, at S360, an informing section, such as the informing section 252, may indicate the location of the group and the location of the stray mobile device(s) to the representative mobile device for each group. In one embodiment, the informing section may transmit the information of the locations of the groups to the representative mobile devices of the groups.

The informing section may also transmit information of identification of the stray mobile device(s) of a group (e.g., name of the user), and the location of the stray mobile device(s) to the mobile devices. Thereby, the system may notify members of the groups, of current locations of the groups and group members that have strayed from the groups, and help the group members to travel in groups.

Next, at S370, a displaying section, such as the displaying section 16 of the mobile devices 10, may display a location of the group to which the mobile device belongs and locations of other groups near the group to which the mobile device belongs. In one embodiment, the displaying section may show a map and the location of the group to which the mobile device belongs on the map on the display screen, and the locations of other groups on the map. If there is a stray mobile device, then the displaying section may display the location(s) of the stray device(s) of the group to which the mobile device belongs.

Next, at S380, the detecting section may determine whether the stray mobile device detected at S350 leaves the group to which the mobile device belongs. In one embodiment, the detecting section may determine that the stray device is distant from the location of the group to which the mobile device belongs by a certain distance, and/or, that the stray device is distant from the location of the group to which the mobile device belongs for a time longer than a certain time. If the detecting section determines that the stray device has left the group, then the detecting section may proceed with S385, and if not, then the detecting section may proceed with S390.

At S385, a changing section, such as the changing section 216, may delete the information of the group from the record of the mobile device in the device ID list, which may be stored in a storing section such as the storing section 206. Thereafter, the mobile device that has left may be treated as a solitary mobile device. The changing section may end the stray mobile device detection.

At S390, the changing section may determine whether an existing solitary mobile device may join a group of the plurality of groups. In one embodiment, the changing section may determine whether the solitary mobile device is within a certain distance from at least one of the locations of the groups. In one embodiment, the changing section may further determine whether the solitary device is eligible to join to the group according to the group policy stored in the storing section. If the decision is positive, then the changing section may proceed with S395, and if negative, then the changing section may end the stray mobile device detection.

At S395, the changing section may add the solitary mobile device to the group. In one embodiment, the changing section may notify a representative mobile device of the group to be joined (e.g., the group nearest to the solitary mobile device) of the solitary mobile device, and receive a response from the representative mobile device. If the response indicates that the group accepts the solitary mobile device, the changing section may add information of the group to the record of the solitary mobile device in the device ID list and may transmit the notification that the solitary mobile device enters the group, to the mobile devices of the group. If the response indicates that the group rejects the solitary mobile device, the changing section may transmit the notification that the group rejects the solitary mobile device, to the solitary mobile device. The changing section may end the stray mobile device detection.

As described above, through the operations of S380-S395, the changing section may dynamically change the mobile devices of at least one group. Through the operations of S380-S395, at least two groups may exchange a mobile device.

Figure 7:
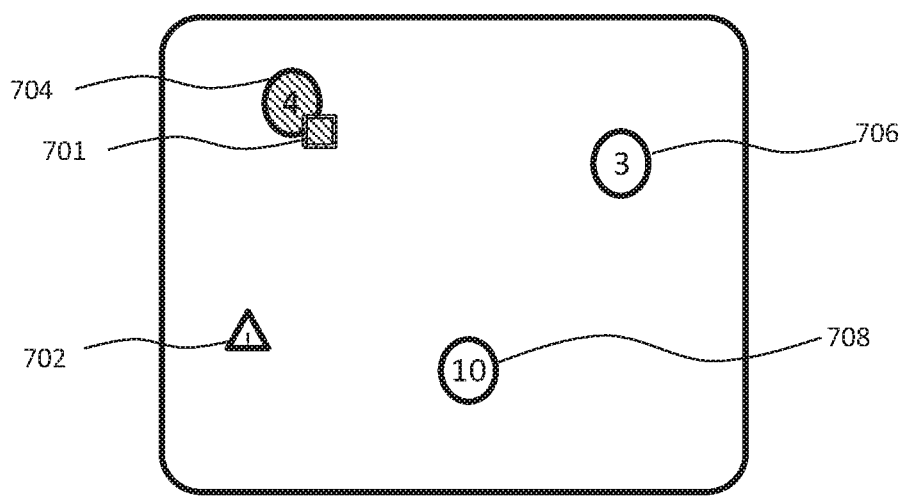
FIG. 7 shows an example of a display screen of the mobile devices displaying the groups according to an embodiment of the present disclosure.

FIG. 7 shows an example of a display screen of the mobile devices displaying the groups. The displaying section may show locations of the groups as shown in FIG. 7 in the display screen of the mobile device. In FIG. 7, the display screen may show locations of Group A (704), Group B (706), Group C (708) on the map. Numbers shown in circles of Groups A-C may represent headcounts of Groups A-C. In one embodiment, Group A may include 4 mobile devices (or 4 group members), Group B may include 3 mobile devices, and the group C may include 10 mobile devices.

A group to which one mobile device belongs is distinguishably displayed on the display screen of the one mobile device. For example, a mobile devices belonging to the group A may display Group A by a color, size, brightness, font type, or the like different from other groups. In the example of FIG. 7, the mobile device of Group A displays Group A by a hatched circle, and other Groups by a not-hatched circles. The mobile device may display a plurality of groups with different colors on the display screen.

In addition, a representative mobile device may display its representing group differently from other mobile devices in the group. In one embodiment, the representative mobile device representing Group A may display a representative mark 701 near the circle of Group A, while the other mobile devices in Group A may display the circle of Group A without the representative mark 701. Thereby, the system may notify the users of the representative mobile device (or the leader of Group A) to represent the groups.

A triangular mark 702 may represent a stray mobile device. In one embodiment, mobile devices (or only a representative mobile device) of a group may display the location of the stray mobile device on the map.

Figure 8:
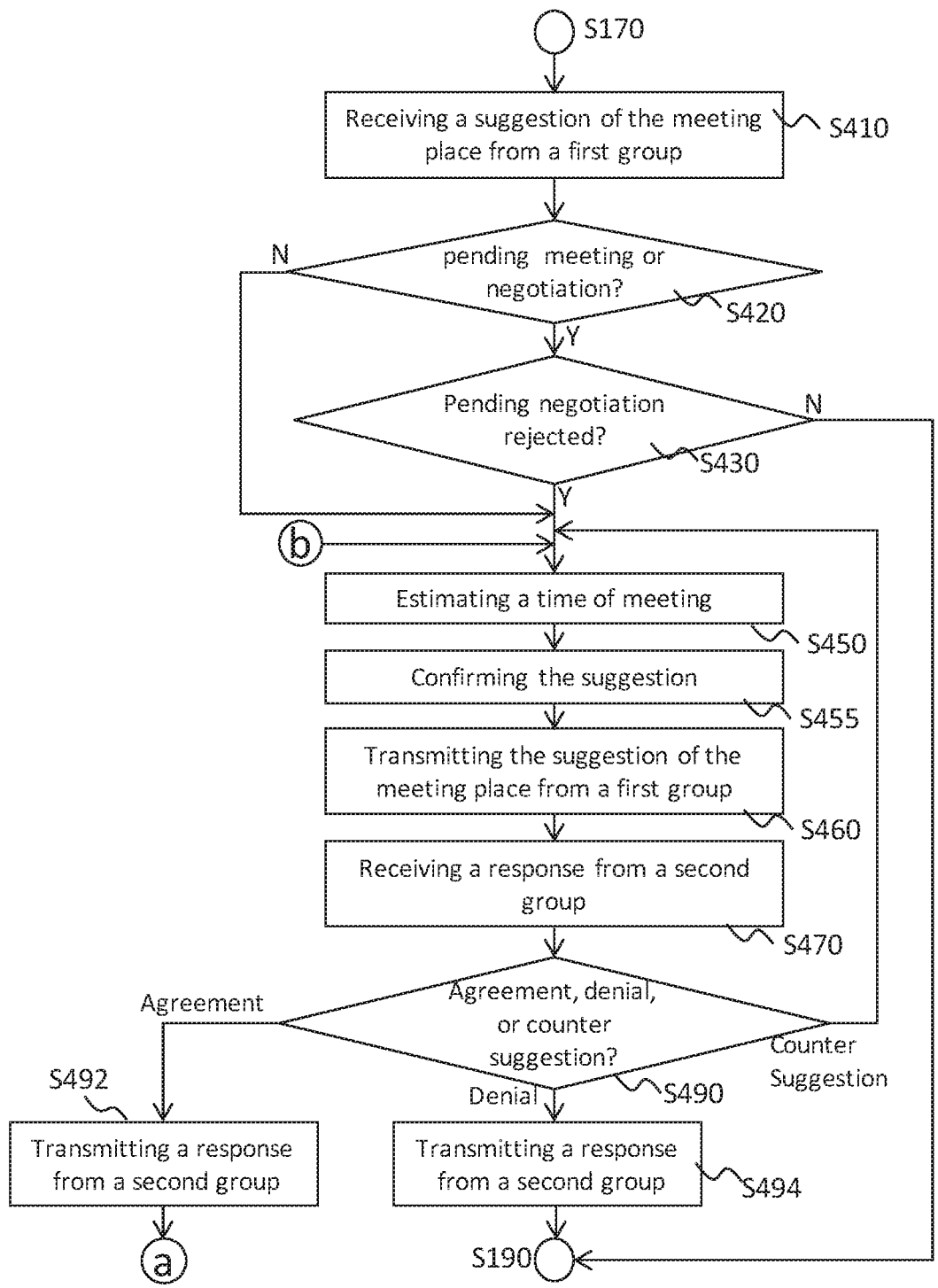
FIG. 8 shows an example operational flow of the system according to an embodiment of the present disclosure.

FIG. 8 shows an example operational flow of the system according to an embodiment of the present disclosure. The present embodiment describes an example in which a system, such as the system 1, performs the operations from S410 to S490, as shown in FIG. 8.

The system may perform the operation of meeting and merging, such as a part of S180 in FIG. 3, by performing the operations S410-S494. The system may manage negotiation of a meeting place between two groups by performing operations of S410-S494.

At S410, a facilitating section, such as the facilitating section 212, may first receive a suggestion of the meeting place from a representative mobile device of one group (which may hereinafter be referred to as "first group") among the at least two groups. In one embodiment, if/when members of the first group may wish to join another group (which may hereinafter be referred to as "second group") and travel to the target location with the second group, the representative mobile device of the first group may input a suggestion of meeting with the second group including a suggested meeting place, from its user. The representative mobile device may transmit the suggestion to the facilitating section of the server.

Next, at S420, the facilitating section may determine whether the second group is on the way to a meeting place with another group, or is having a negotiation of a meeting with another group. In one embodiment, if the facilitating section has already received a suggestion of meeting with the second group from another group and the suggestion has not been accepted nor rejected by the second group, then the facilitating section may determine that the second group has a pending negotiation. If the second group has accepted the suggestion from another group and is on the way to the meeting place with the another group, then the facilitating section may determine that the second group has a pending meeting.

If the second group has a pending meeting, then the facilitating section may proceed with S430. If the second group has a pending negotiation, then the facilitating section may wait for a certain time, and then proceed with S430. If the second group does not have a pending meeting or negotiation, then the facilitating section may proceed with S450.

At S430, the facilitating section may determine whether the second group has rejected the pending negotiation. In one embodiment, the facilitating section may receive the rejection from the second group as to the pending negotiation. In such a case, the facilitating section may determine that the second group has rejected the pending negotiation.

If the second group has rejected the pending negotiation, then the facilitating section may proceed with S450, and if not, then the facilitating section may end the operation of meeting and merging. If the second group has the pending meeting, the facilitating section may end the operation of meeting and merging.

At S450, the facilitating section may estimate a time of meeting of the first group and the second group, based on the suggestion from the first group.

In one embodiment, the facilitating section may determine a reasonable route (e.g., the shortest route) between a location of the first group and the suggested meeting place by a known algorithm (e.g., Dijkstra's Algorithm), and calculate a total length of the route. The facilitating section may calculate an amount of time for the first group to arrive at the suggested meeting place by dividing the total length of the route by a usual walking speed (e.g., 4 km/hour), and adding the amount of time to the current time to obtain a first time at which the first group arrives at the suggested meeting place.

Similarly, the facilitating section may estimate a second time at which the second group arrives at the suggested meeting place. The facilitating section may compare the first time and the second time, and determine the later one as the suggested meeting time of the first group and the second group.

At S455, the facilitating section may confirm whether to send the suggestion to the second group. In one embodiment, the facilitating section may send, to the representative mobile device of the first group, a message of confirmation of whether to send the suggestion of meeting at the suggested meeting place on the estimated time of meeting to the second group.

The facilitating section may receive a response from the representative mobile device of the first device. In one embodiment, the facilitating section may receive the response of "OK", "Postponing the meeting time", or "Changing suggestion." If the response is "OK", then the facilitating section may proceed with S460. If the response is "Postponing the meeting time", then the facilitating section may receive a new meeting time from the representative mobile device, update the suggested meeting time with the new meeting time, and proceed with S460. If the response is "Changing suggestion", then the facilitating section may go back to the operation of S410.

At S460, the facilitating section may transmit the suggestion to at least a second group among the at least two groups. In one embodiment, the facilitating section may transmit the suggestion from the first group to a representative mobile device of the second group. The facilitating section may transmit the suggestion including the suggested meeting place, and the meeting time estimated at S450 or updated at S455.

The representative mobile device of the second group may show the suggestion and the estimated time on the display screen, and input the response to the suggestion from the user.

Next, at S470, the facilitating section may receive the response to the suggestion of the first group from the second group. In one embodiment, the facilitating section may receive an agreement to the suggestion of the first group, a denial to the suggestion of the first group, or a counter suggestion of the meeting place, from the representative mobile device of the second group.

Next, at S490, if the facilitating section receives the agreement at S470, then the facilitating section may proceed with an operation of S492. If the facilitating section receives the denial at S470, then the facilitating section may proceed with an operation of S494.

If the facilitating section receives the counter suggestion at S470, then the facilitating section may go back to S450. In this case, the facilitating section may treat the counter suggestion from the second group as a new suggestion received at S410, and at S460, the facilitating section may transmit the counter suggestion to the representative mobile device of the first group.

At S492, the facilitating section may transmit the response to the suggestion of the first group from the second group, to the first group. In one embodiment, the facilitating section may transmit the agreement from the representative mobile device of the second group, to the representative mobile device of the first group. The facilitating section may go to "a" which is explained in relation to FIG. 14.

At S494, the facilitating section may transmit the response to the suggestion of the first group from the second group, to the first group. In one embodiment, the facilitating section may transmit the denial from the representative mobile device of the second group, to the representative mobile device of the first group. The facilitating section may end the operation of meeting and merging.

Figure 9:
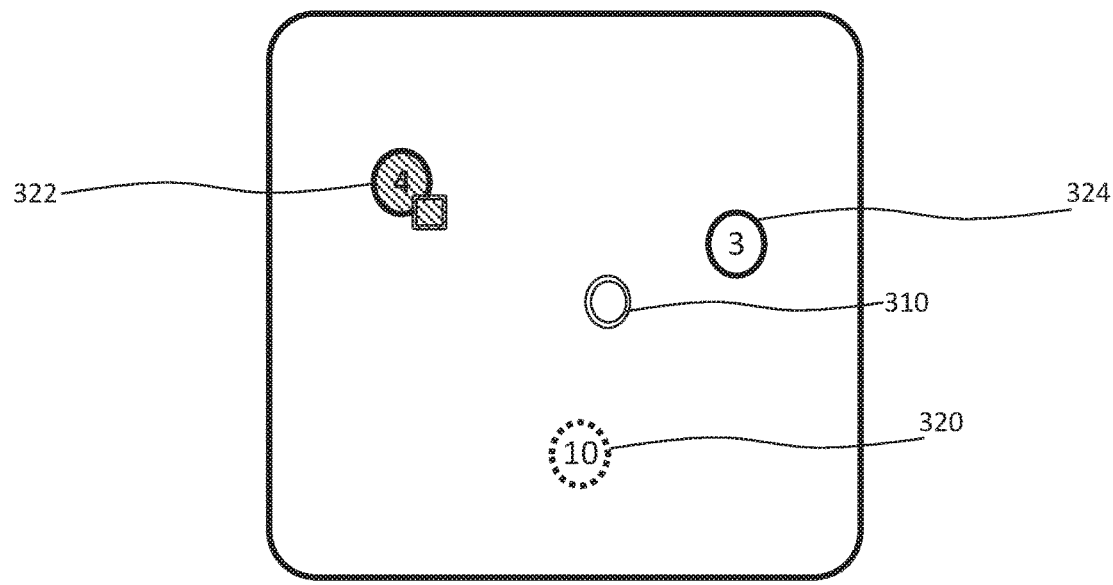
FIG. 9 shows an example of a display screen of the representative mobile device displaying the first group according to an embodiment of the present disclosure.

FIG. 9 shows an example of a display of the representative mobile device of the first group. The representative mobile device of the first group may input a meeting place from the user (or the leader of the first group), and show the input place on the display screen at S410. A circle 310 may represent place on a map that the representative mobile device of Group A (322) inputs as the suggested meeting place at S410. In one embodiment, the user may input the place by a touch screen. It must also be appreciated that groups B and C are represented by circles 324 and 320 respectively.

Figure 10:
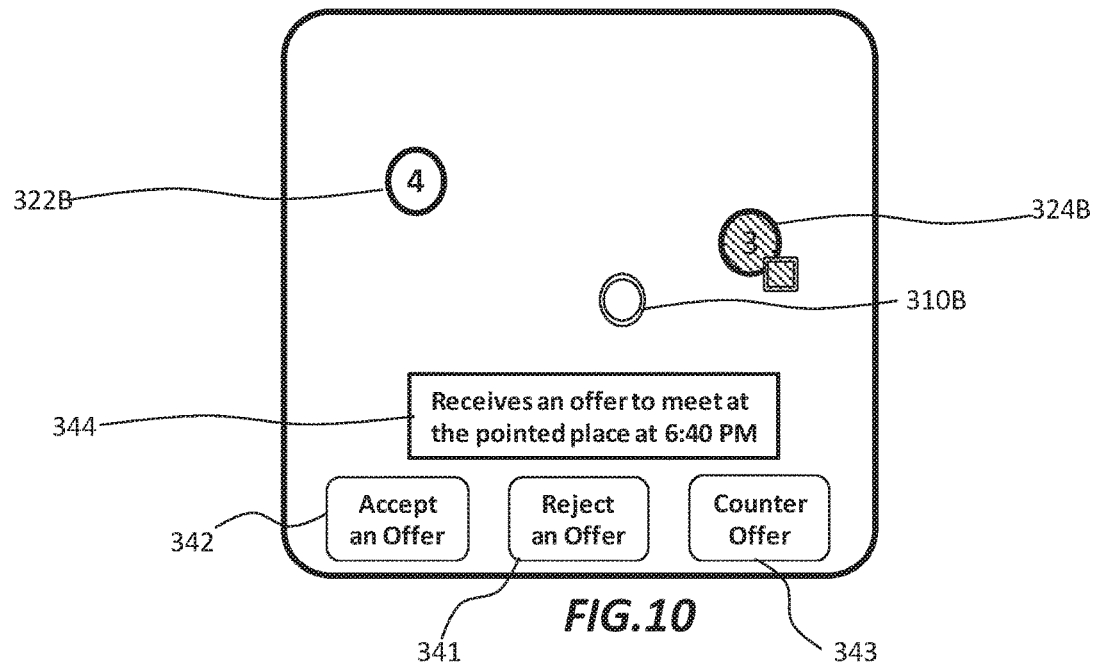
FIG. 10 shows an example of a display screen of the representative mobile device displaying the second group according to an embodiment of the present disclosure.

FIG. 10 shows an example of a display of the representative mobile device of the second group. The representative mobile device of the second group may show a message "Receives an offer to meet at the pointed place at 6:40 PM" (344B) as shown in FIG. 10 at S460 and input response from the user. In one embodiment, the representative mobile device of the second group may show the meeting place suggested by the first group by the circle 310B. The representative mobile device may input a response to the suggestion among "Accept Offer" (342), "Reject Offer" (341), and "Counter Offer" (343) on the display screen. The user of the mobile device may input response by tapping the "Accept Offer" icon corresponding to the agreement, the "Reject Offer" icon corresponding to the denial, or the "Counter Offer" icon corresponding to the counter suggestion. It must also be appreciated that groups A and B are represented by circles 324B and 320B respectively.

Figure 11:
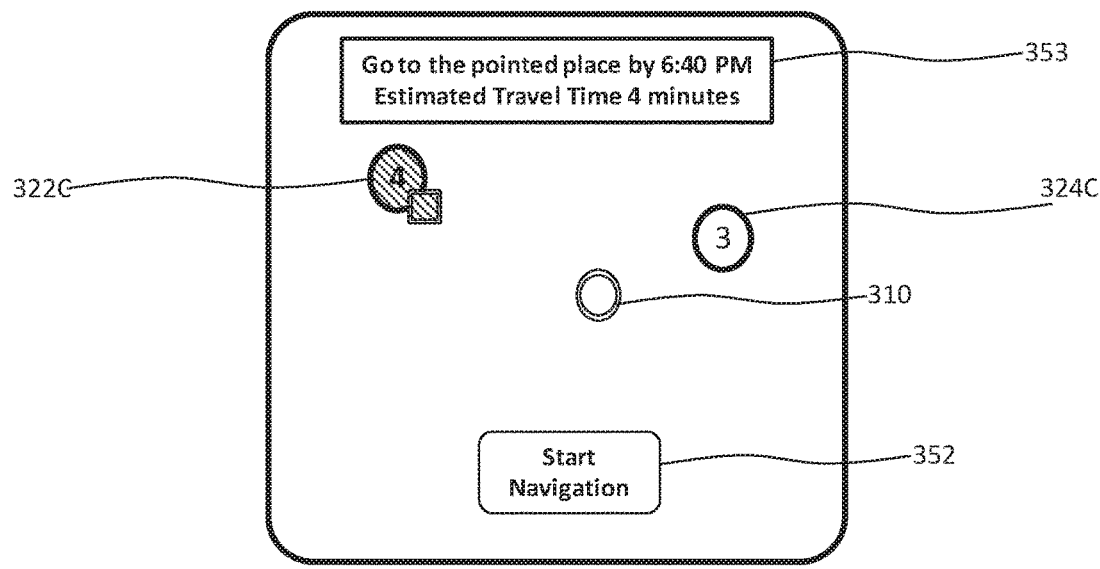
FIG. 11 shows an example of a display screen of the representative mobile device displaying the first group according to an embodiment of the present disclosure.

FIG. 11 shows an example of a display of the representative mobile device of the first group. If the facilitating section transmits the agreement to the representative mobile device of the first group at S492, then the representative mobile device may show a message to start navigation as shown in FIG. 11. It must also be appreciated that groups A and B are represented by circles 324C and 322C respectively.

The representative mobile devices of the first group and the second group may show a "Start Navigation" button (button 352) on the display screen. If the users of the representative mobile devices tap the "Start Navigation" button, then the representative mobile devices may display navigation information to the meeting place represented by the circle 310.

In one embodiment, the representative mobile devices may transmit a request of the navigation information to the server, and the server may generate and transmit the navigation information to the representative mobile devices. In other embodiment, the representative mobile devices of the first group and the second group may each generate the navigation information. The navigation information may include recommended route to the meeting place, and may be generated by the facilitating section such as navigation information 353.

Figure 12:
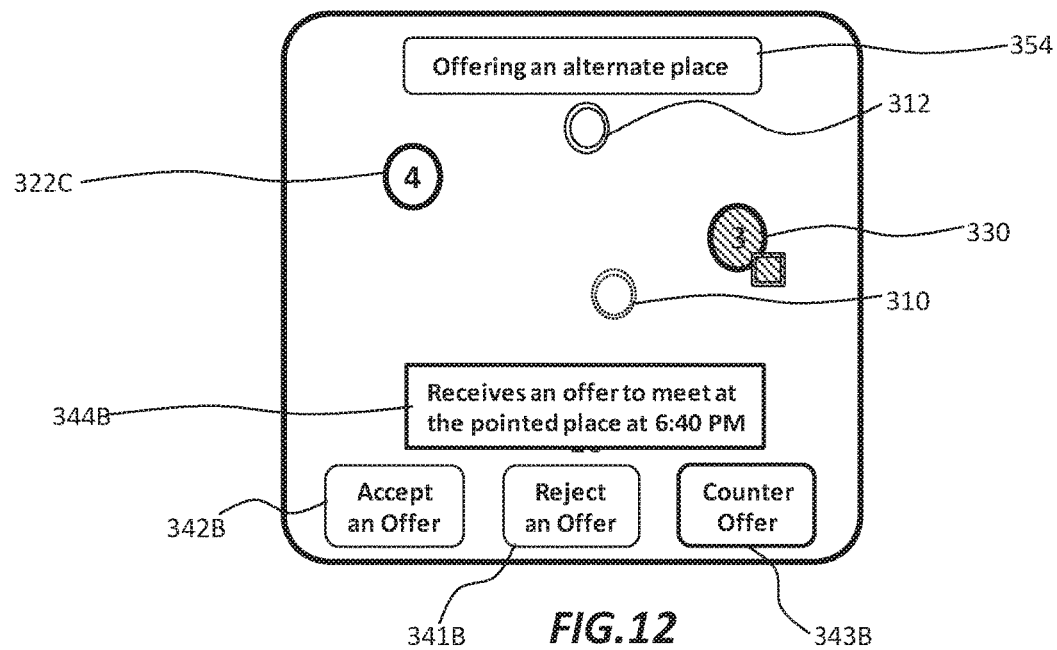
FIG. 12 shows an example of a display screen of the representative mobile device displaying the second group according to an embodiment of the present disclosure.

FIG. 12 shows an example of a display of the representative mobile device of the second group. If the representative mobile device of the second group selects "Counter Offer" (343B) after receiving the suggestion from the first group at S460, the representative mobile device of the second group may show a message to select alternate meeting place as shown in FIG. 12 (by boxes 341B, 342B and 343B). It must also be appreciated that group B is shown here with circle 330.

In one embodiment, the representative mobile device of the second group may show a message "Offering an alternate place" (354) on the display screen, and input an alternate meeting place from the user (or the leader of the second group) by tapping of the display screen. The representative mobile device of the second group may show the input alternative meeting place on the display screen as shown by a circle 312. The representative mobile device of the second group may also show the place previously suggested by the first group in a less represented manner as shown by the dot circle 310.

Figure 13:
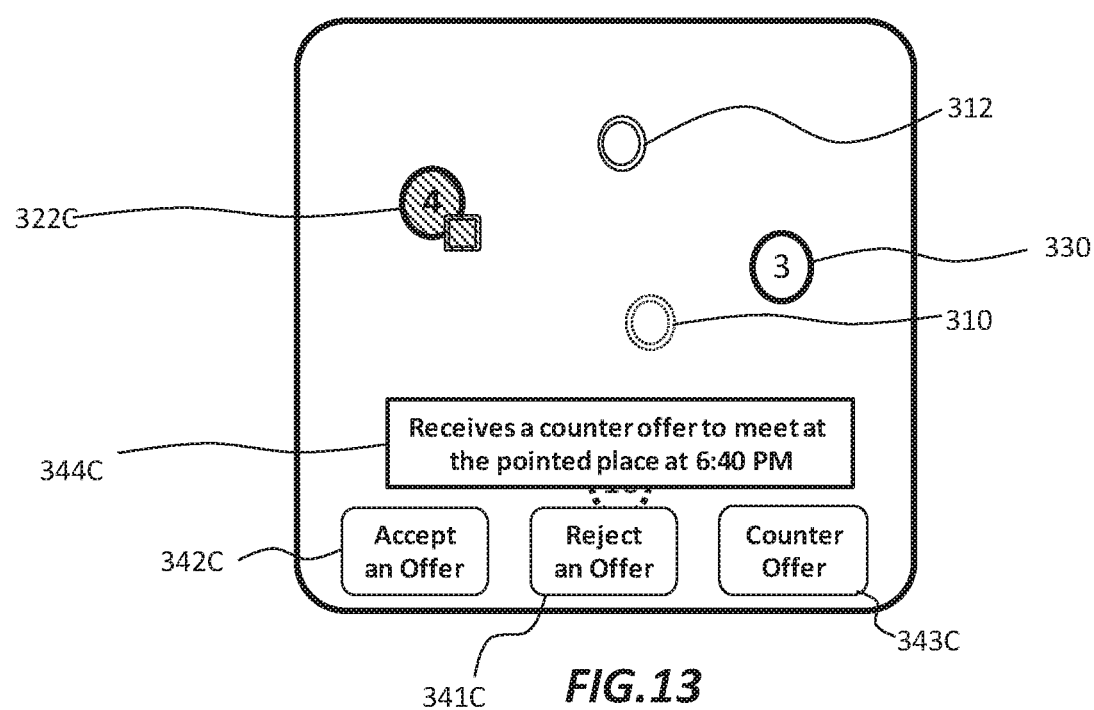
FIG. 13 shows an example of a display screen of the representative mobile device displaying the first group according to an embodiment of the present disclosure.

FIG. 13 shows an example of a display of the representative mobile device of the first group. If the facilitating section transmits "Counter Offer" (344C) to the representative mobile device of the first group at S460 via S490, the representative mobile device of the first group may show a message to select a response to the counter offer as shown in FIG. 13. The representative mobile device of the first group may input a response to the suggestion among "Accept Offer" (342C), "Reject Offer" (341C), and "Counter Offer" (343C) on the display screen in a similar manner explained relating to FIG. 10.

Figure 14:
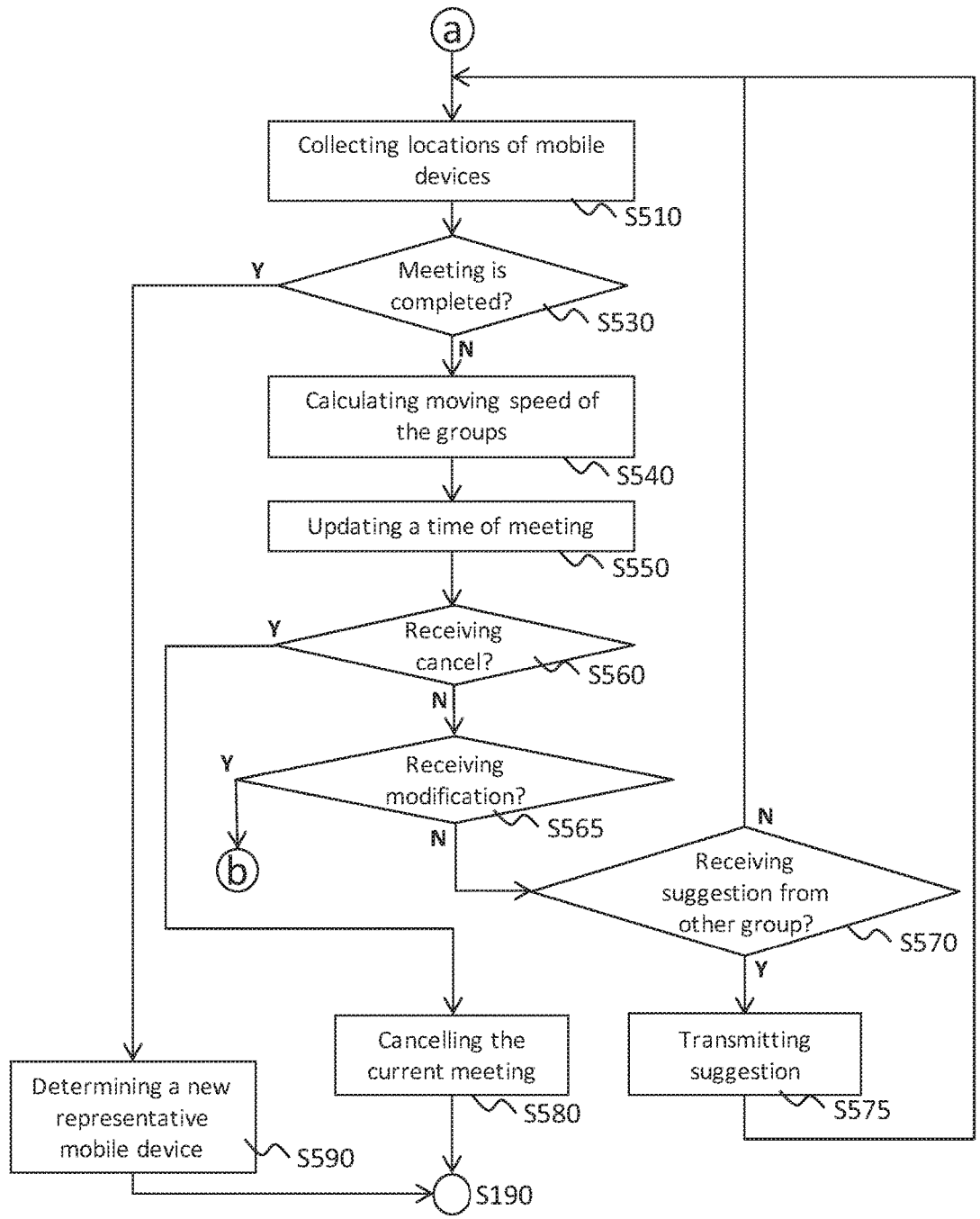
FIG. 14 shows an example operational flow of the system according to an embodiment of the present disclosure.

FIG. 14 shows an example operational flow of the system according to an embodiment of the present disclosure. The present embodiment describes an example in which a system, such as the system 1, performs the operations from S510 to S590, as shown in FIG. 14. The system may perform the operations of S510-S590 after "a" of the flow in FIG. 8.

At S510, the collecting section may collect locations of the mobile devices. The collecting section may perform S510 in the same manner with S310. The collecting section may not perform S510, and use the locations of the mobile devices obtained at S310.

Next at S530, the identifying section may determine whether the meeting of the first group and the second group is completed. In one embodiment, the identifying section may determine the locations of the first group and the second group, and determine whether the locations are within a certain distance. In other embodiments, the identifying section may determine whether a certain number/ratio of members of the first group and the second group are located within a circle having a certain radius. In other embodiments, the identifying section may determine whether the representative mobile devices of the first group and the second group are located within a certain distance.

If determining that the meeting of the first and second groups is completed, the identifying section may proceed with S590. If determining that the meeting is not completed, the identifying section may proceed with S540.

At S540, a calculating section such as the calculating section 230 may calculate moving speed of the first group and moving speed of the second group. In one embodiment, the calculating section may calculate moving speed of a group based on speeds of median points of the group that move faster than a threshold speed. Thereby, the calculating section may reduce noise from the estimated speed.

Next, at S550, an estimating section such as the estimating section 232 may update the time that the at least two groups will meet at the meeting place based on the moving speeds of the at least two groups. In one embodiment, the estimating section may estimate the meeting time when the first group and the second group meets based on the moving speed estimated at S540, the location of the first group and the location of the second group. The estimating section may estimate the meeting time in a similar manner to the operation of S450.

The estimating section may transmit the estimated meeting time to the mobile devices of the first group and the second group. The mobile devices of the first group and the second group may display the updated meeting time on the display screen.

Next, at S560, the facilitating section may determine whether to receive cancel of the meeting from the representative mobile device of the first group or the second group. The representative mobile device of the first group and/or the second group may input cancel of the meeting from the user (e.g., the leader of the first/second group), before the first group and the second group meet, and may transmit the cancel of the meeting to the facilitating section.

If the facilitating section receives the cancel of the meeting, then the facilitating section may proceed with S580, and if not, the facilitating section may proceed with S565.

At S565, the facilitating section may determine whether to receive modification to the meeting from the representative mobile device of the first group or the second group. The representative mobile device of the first group and/or the second group may input modification to the meeting (e.g., changing a meeting place, and/or, meeting time) from the user (e.g., the leader of the first/second group), before the first group and the second group meet, and may transmit the modification to the meeting to the facilitating section.

If the facilitating section receives the modification to the meeting, then the facilitating section may go to "b" which is processed before S450 in FIG. 8, and if not, the facilitating section may proceed with S570. After going to "b", the facilitating section may treat the modification to the meeting as a new suggestion received at S410 and proceed with the operation of S450 and further operations.

Next, at S570, the facilitating section may determine whether to receive the suggestion of meeting for the first group or the second group from the other group. If the facilitating section receives the suggestion from the representative mobile device of the other group, the facilitating section may proceed with S575. If the facilitating section does not receive the suggestion from the other group, the facilitating section may go back to the operation of S510.

At S575, the facilitating section may transmit the suggestion from the representative mobile device of the other group, to the representative mobile device of an object group. In one embodiment, if the facilitating section receives the suggestion of meeting to the first group from a third group at S570, the facilitating section may transmit the suggestion to the first group. At S575, the facilitating section may transmit the meeting place of the objective group (e.g., the first group) to the other group (e.g., the third group).

At S580, the facilitating section may cancel the current meeting of the objective group (e.g., the first group) and end the operation of S180.

At S590, a determining section such as the determining section 240 may determine a new representative mobile device among representative mobile devices of the first group and the second group. In one embodiment, the determining section may determine the new representative mobile device based on the numbers of mobile devices of the first group and the second group. In the embodiment, the determining section may determine the representative mobile device of the group that has larger number of mobile devices in the group as the new representative mobile device.

In one embodiment, the determining section may determine the new representative mobile device based on which group of the at least two groups suggested a meeting. In the embodiment, the determining section may determine the representative mobile device that has first sent the suggestion to the other group as the new representative mobile device.

A merging section such as the merging section 214 may update the information stored in the storing section to reflect the meeting of the first group and the second group. In one embodiment, the merging section may process a merger of the first group and the second group. In the embodiment, the merging section may update information of the group in the device ID list of the mobile devices to replace a merged group (e.g., a group received the suggestion) with a merging group (e.g., a group transmitting the suggestion), and to update information of the representative mobile device in the device ID list.

In one embodiment, the determining section may determine the new representative mobile device of the new group based on locations of mobile devices of the new group. In the embodiment, the determining section may determine one mobile device that is the closest to a center location of the new merged group as the new representative mobile device.

In one embodiment, after the first group and the second group have met, the first group and the second group may not be merged. In the embodiment, the first group and the second group may move together to the target location.

Figure 15:
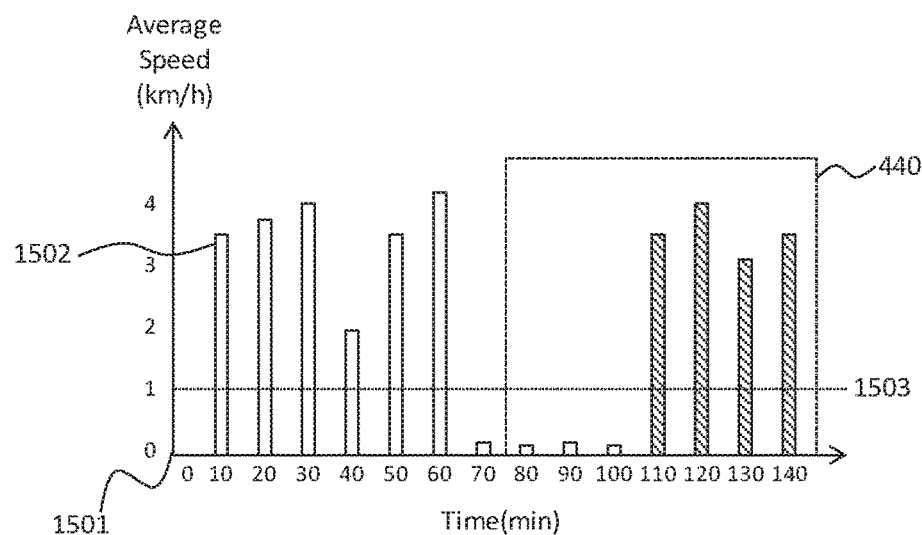
FIG. 15 shows an example of average moving speed of a group according to an embodiment of the present disclosure.

FIG. 15 illustrated a chart 1501 which is a graphical representation of average moving speed of a group. One group (e.g., the first group 1502), may move to the meeting place according to the average moving speed shown in FIG. 15. The calculating section may calculate the average moving speed of a group for a plurality of duration (e.g., 10 min). The calculating section may calculate average speed for a certain duration by calculating distance (direct distance or pathway distance) between a location of the group at the beginning of the duration and a location of the group at the end of the duration, and dividing the distance by the duration.

At S540 in FIG. 14, the calculating section may calculate moving speed of a group based on the average speed shown in FIG. 15. In one embodiment, the calculating section may calculate moving speed of a group based on the latest 60 min average speed of the group as indicated by a box 440. The latest 60 min corresponds 80-140 min on the graph of FIG. 15. Here, the calculating section may calculate moving speed of the group using average speed equal or above a threshold such as threshold 1503 (1 km/hour), which corresponds to average speed at 110-140 min, without using average speed below the threshold, which corresponds to average speed at 80-100 min.

Figure 16:
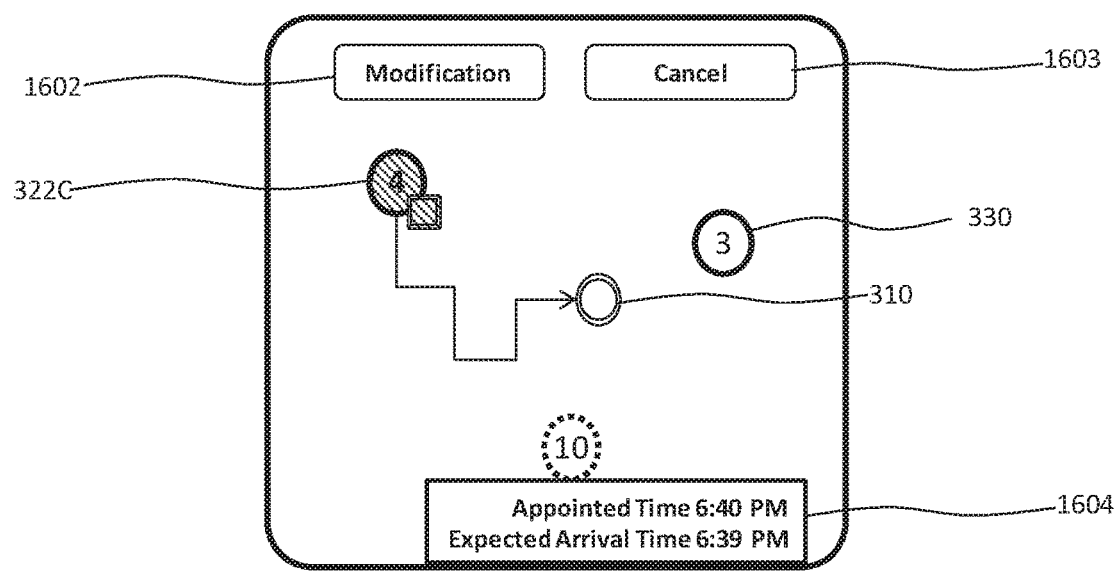
FIG. 16 shows a display screen of the representative mobile device displaying the first group during the navigation according to an embodiment of the present disclosure.

FIG. 16 shows a display of the representative mobile device of the first group during the navigation. At S550 of FIG. 14, the mobile devices of the first group and the second group may show the updated meeting time estimated by the estimating section. In one embodiment, the representative mobile device of the first group may show a navigated route to the meeting place 310 and the updated meeting time on the display screen such as display 1604. It must be mentioned that like many other embodiments of the user interface options for modification 1602 and cancel 1603 are displayed.

Figure 17:
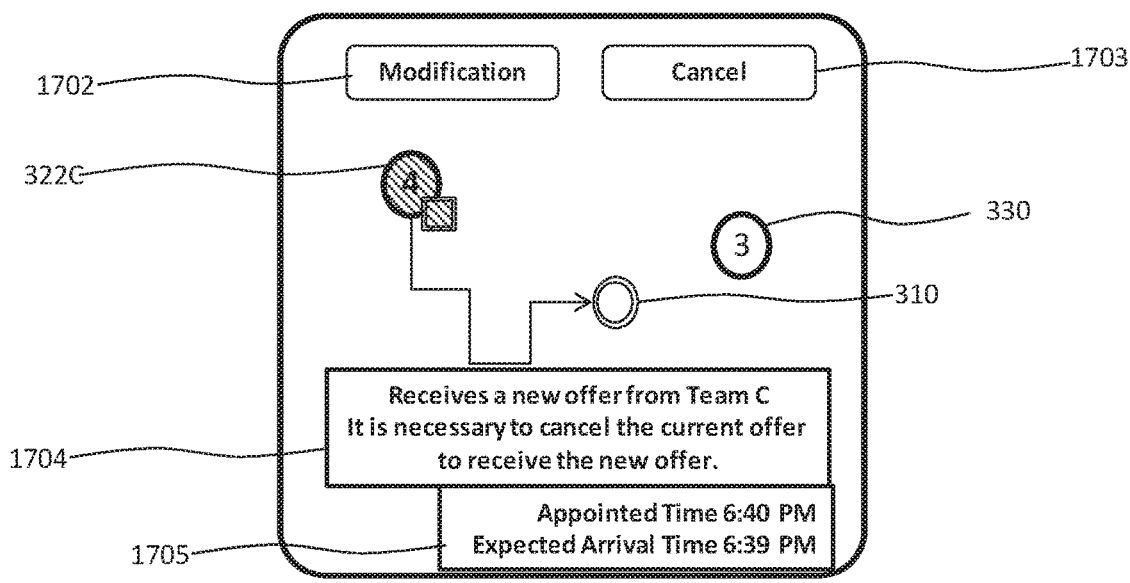
FIG. 17 shows a display screen of the representative mobile device displaying the first group during the navigation according to an embodiment of the present disclosure.

FIG. 17 shows a display of the representative mobile device of the first group during the navigation. At S575 of FIG. 17, the representative mobile devices of the object group (e.g., the first group) may receive the suggestion from the other group from the facilitating section, and show a message on the display screen to notify a reception of the new suggestion as shown in FIG. 17 such as display 1704 or 1705. After reviewing the message, the user of the representative mobile device may cancel (1703) the current meeting to accept the new suggestion instead of the current meeting (modification 1702).

In one embodiment, the system may automatically create groups and start a session. For example, the server may detect a crowd of people from a variety of sensors, presume a reason that the people gather based on posts to SNS. The setting section may select an appropriate group policy based on a characteristic of the people (e.g., the reason of gathering), register mobile devices of the people as temporary participants to the session, start a session, and start the session.

The creating section may send a message to register as participants to the session or a representative mobile device of a group to the mobile devices of the participants. The creating section may send messages to the representative mobile devices to encourage the representative mobile devices to form groups. The system may continue the operations such as S165-S190 until the end of the session.

The system and method described above are applicable to a variety of events. In one embodiment, the system and method may be applicable to a travel with a plurality of groups (e.g., family, classmate, colleagues etc.), a packaged tour, a public viewing, etc.

Figure 18:
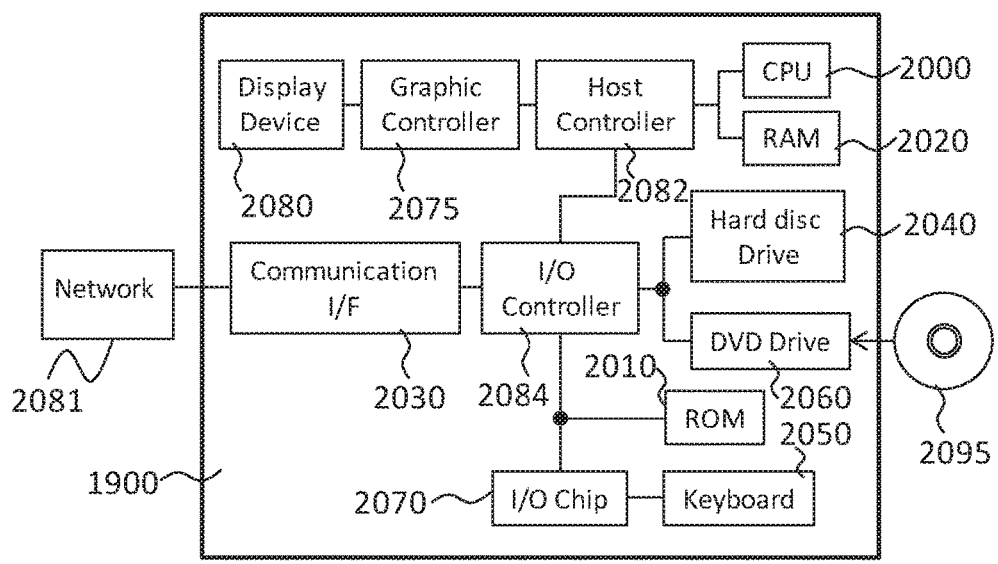
FIG. 18 shows an example of a computer 1900 in which a device, a server, an operational flow, and/or other embodiments of the claimed disclosure may be wholly or partly embodied.

FIG. 18 shows an example of a computer 1900 in which the mobile devices 10 and the server 20, the operational flow of FIGS. 3, 4, 6, 8 and 14, and/or other embodiments of the claimed disclosure may be wholly or partly embodied.

The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network such as network 2081. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the mobile devices 10 and the server 20 of FIG. 1. The program or module acts on the CPU 2000, to cause the computer 1900 to function as some or all of the sections, components, elements, etc. of the mobile devices 10 and the server 20 of FIG. 1 (e.g., the setting section 202, the creating section 204, the storing section 206, the providing section 208, etc.).

A program that is installed in the computer 1900 can also cause the computer 1900 to perform an operational flow such as the operational flow of FIGS. 3, 4, 6, 8 and 14. Such a program may act on the CPU 2000 to cause the computer 1900 to perform some or all of the steps of FIGS. 3, 4, 6, 8 and 14.

The information processing described in these programs is read into the computer 1900 such as the server 20 of FIG. 1 function as each section (e.g., the setting section 202, the creating section 204, the storing section 206, the providing section 208), resulting in the cooperation between the program or module and the above-mentioned various types of hardware resources. An apparatus or method may be constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the certain condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present disclosure has (have) been described, the technical scope of the disclosure is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the disclosure.

While the embodiment(s) of the present disclosure has (have) been described, the technical scope of the disclosure is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the disclosure.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present disclosure can be used to realize a system for supporting management of groups of people.

What is claimed is:

1. A method comprising:
   storing, by a computer, a list of mobile devices;
   creating, by the computer, a plurality of groups of the mobile devices, each group comprising at least one mobile device, based on locations of the mobile devices;
   providing, by the computer, at least one mobile device of the plurality of groups with information of a target location; and
   handling, by the computer, information for a mutual interaction between at least two groups of the plurality of groups, wherein the handling of information for the mutual interaction includes exchanging a mobile device between the at least two groups of the plurality of groups when the mobile device reaches a targeted location, wherein the exchanging the mobile device between the at least two groups of the plurality of groups comprising adding the mobile device to at least one group of the plurality of groups while deleting the mobile device from another of the at least one group of the plurality of groups.

2. The method of claim 1, further comprising:
   collecting, by the computer, locations of the mobile devices of each group; and
   identifying, by the computer, a location of each group based on the locations of the mobile devices of the each group.

3. The method of claim 2, further comprising transmitting, by the computer, the location of the plurality of groups to the mobile devices of each group.

4. The method of claim 3, wherein the handling includes facilitating, by the computer, an exchange of information of a meeting place between the at least two groups.

5. The method of claim 4, wherein the facilitating includes
   receiving, by the computer, a suggestion of the meeting place from a representative mobile device of a first group among the at least two groups, and
   transmitting, by the computer, the suggestion to at least a second group among the at least two groups.

6. The method of claim 5, wherein the facilitating further includes:
   receiving, by the computer, an agreement, a denial or a counter suggestion of the meeting place from a representative mobile device of the second group, and
   transmitting, by the computer, the agreement, the denial or the counter suggestion to the representative mobile device of the first group.

7. The method of claim 4, further comprising estimating, by the computer, a time that the at least two groups will meet at the meeting place based on the locations of the at least two groups.

8. The method of claim 7, further comprising:
   calculating, by the computer, moving speeds of the at least two groups; and
   the estimating comprising updating, by the computer, the time that the at least two groups will meet at the meeting place based on the moving speeds of the at least two groups.

9. The method of claim 8, wherein the calculating is performed based on speeds of median points of the at least two groups that move faster than a threshold speed.

10. The method of claim 1, wherein the handling includes merging, by the computer, the at least two groups of the plurality of groups into a new group.

11. The method of claim 10, the merging comprising determining, by the computer, a new representative mobile device among representative mobile devices of the at least two groups, based on the numbers of mobile devices of the at least two groups or based on which group of the at least two groups suggested a meeting.

12. The method of claim 10, further comprising determining, by the computer, a new representative mobile device of the new group based on locations of mobile devices of the new group.

13. The method of claim 1, further comprising:
   detecting, by the computer, a stray mobile device apart from the group that the stray mobile device belongs to; and
   informing, by the computer, a representative mobile device of the group with a location of the stray mobile device.

14. The method of claim 1, wherein the handling includes changing, by the computer, mobile devices of at least one group dynamically.

15. The method of claim 1, further comprising:
   collecting, by the computer, locations of the mobile devices; and
   wherein the creating includes dividing the mobile devices into the plurality of groups based on the locations of the mobile devices.

16. A non-transitory computer program product comprising a computer-readable storage medium having program code embodied therewith, the program code executable by a processor of a computer to perform a method comprising:
   storing a list of members, wherein the members attend an event;
   creating a plurality of groups, each group including at least one member, based on locations of the members;
   guiding each of the plurality of groups for attending the event; and
   handling a mutual interaction between at least two groups of the plurality of groups, wherein the handling the mutual interaction includes exchanging a mobile device between the at least two groups of the plurality of groups when the mobile device reaches a targeted location, wherein the exchanging the mobile device between the at least two groups of the plurality of groups comprising adding the mobile device to at least one group of the plurality of groups while deleting the mobile device from another of the at least one group of the plurality of groups.

17. The non-transitory computer program product of claim 16, wherein the instructions are executable by the computer to cause the computer to further perform:
   collecting locations of the members of each group; and
   identifying a location of each group based on the locations of the members of the each group.

18. The non-transitory computer program product of claim 16, wherein the instructions are executable by the computer to cause the computer to further perform transmitting the location of the plurality of groups to the members of each group.

19. A non-transitory computer system, the computer system comprising:
   one or more computer processors;
   one or more computer-readable storage media;
   program instructions stored on the computer-readable storage media for execution by at least one of the one or more processors, the program instructions comprising:
   instructions to store a list of members, wherein the members attend an event;
   instructions to create a plurality of groups, each group including at least one member, based on locations of the members;
   instructions to guide each of the plurality of groups for attending the event; and
   instructions to handle a mutual interaction between at least two groups of the plurality of groups, wherein the instructions to handle the mutual interaction includes exchanging a mobile device between the at least two groups of the plurality of groups when the mobile device reaches a targeted location, wherein the exchanging the mobile device between the at least two groups of the plurality of groups comprising adding the mobile device to at least one group of the plurality of groups while deleting the mobile device from another of the at least one group of the plurality of groups.

20. The non-transitory computer system of claim 19, further comprising:
   a collecting section to collect locations of the members of each group; and
   an identifying section to identify a location of each group based on the locations of the members of the each group.

* * * * *